United States Patent [19]

Borsdorf et al.

[11] 3,911,298

[45] Oct. 7, 1975

[54] CONTROL CIRCUITS FOR PIEZOELECTRIC DEVICES

[75] Inventors: Reinhard Alfred Borsdorf, Northolt; John Frederick Crudgington, West Ewell, both of England

[73] Assignee: C.A.V. Limited, Birmingham, England

[22] Filed: June 24, 1974

[21] Appl. No.: 482,447

[30] Foreign Application Priority Data

June 28, 1973 United Kingdom .............. 30877/73

[52] U.S. Cl. .............................................. 310/8.1
[51] Int. Cl.² .......................................... H01L 41/08
[58] Field of Search ....................... 310/8.1; 318/118

[56] References Cited

UNITED STATES PATENTS

| | | | |
|---|---|---|---|
| 3,315,102 | 4/1967 | Quint et al. | 310/8.1 |
| 3,351,539 | 11/1967 | Branson | 310/8.1 UX |
| 3,801,893 | 4/1974 | Joyce | 310/8.1 X |

*Primary Examiner*—Mark O. Budd
*Attorney, Agent, or Firm*—Harness, Dickey & Pierce

[57] ABSTRACT

A control circuit for controlling the electric charging and discharging of a stack of piezo-electric crystals comprises a capacitor which can be charged from a source of supply. A first thyristor is provided and which when fired allows the capacitor to discharge through the primary winding of a transformer. The transformer has a secondary winding connected through a diode to the stack of crystals, so that the stack of crystals is charged when the first thyristor is fired, a second thyristor being provided which can be fired to effect discharge of the stack of crystals.

5 Claims, 2 Drawing Figures

CONTROL CIRCUITS FOR PIEZOELECTRIC DEVICES

This invention relates to control circuits for controlling the electrical charging and discharging of a stack of piezo-electric crystals, the crystals being of the kind which alter their physical dimensions in accordance with the magnitude of the electrical charge.

The object of the invention is to provide such a control circuit in a simple and convenient form.

A control circuit in accordance with the invention comprises a capacitor which can be charged from a source of supply, a first thyristor which when fired allows the capacitor to discharge through a primary winding of a transformer, the transformer having a secondary winding connected through a diode to said stack of crystals so that the stack of crystals is charged when said first thyristor is fired and a second thyristor which can be fired to effect discharge of said stack of crystals.

According to a further feature of the invention, said second thyristor is connected in parallel with said diode, and a further diode is provided in parallel with said first thyristor, said second thyristor and said further diode being connected so that when said second thyristor is fired, the stack of crystals is discharged through the transformer and effects charging of said capacitor.

Two examples of a control circuit in accordance with the invention will now be described with reference to the accompanying circuit diagrams in which.

Figure 1:
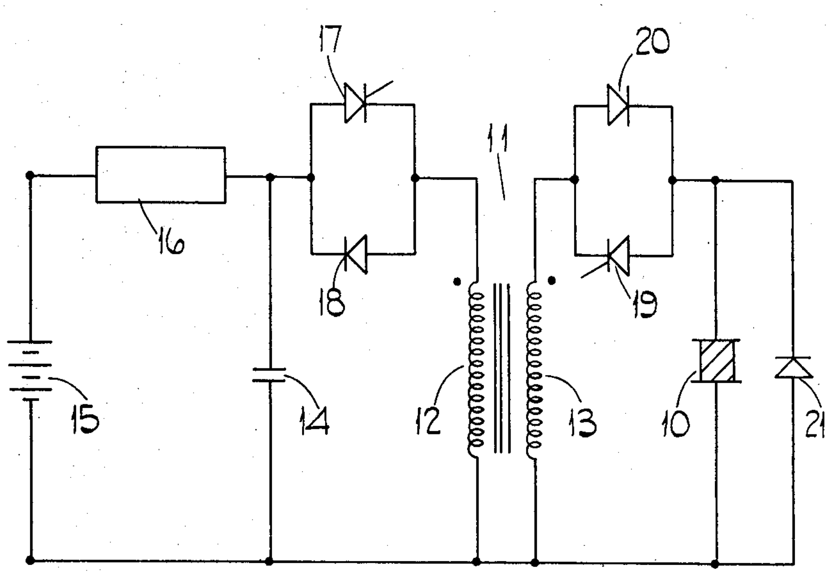
FIG. 1 shows one embodiment of the invention.

The stack of piezo-electric crystals is indicated at 10, and in the particular example, the crystals are utilised in a fuel injection system for an internal combustion engine. The crystals are of the type which when charged from a source of electric supply, expand an in so expanding initiate the injection of fuel to an associated engine.

The control circuit includes a transformer 11 having a primary winding 12 and a secondary winding 13. The primary winding 12 is connected in parallel with a capacitor 14 which is charged from a source of supply conveniently indicated as an accumulator 15. A voltage regulated supply circuit 16 is provided to determine the voltage to which the capacitor is charged.

Interposed between the capacitor and the primary winding of the transformer is a first thyristor 17, having its anode connected to the capacitor, and in parallel with the thyristor is a diode 18 having its cathode connected to the capacitor. The stack of crystals is connected to the secondary winding of the transformer through a similar circuit which includes a second thyristor 19 and a diode 20. Moreover, in parallel with the stack 10 of crystals is a diode 21 having its cathode connected to the cathode of the diode 20.

In operation, the capacitor 14 is charged to a voltage which is determined by the circuit 16. When the thyristor 17 is fired, the capacitor 14 discharges into the primary winding of the transformer. At the same time a voltage is induced in the secondary winding 13 of the transformer, and current flows from the secondary winding through the diode 20 to charge the stack of crystals 10. No current flow occurs through the diode 21. As a result of charging the stack of crystals 10 expansion of the crystals occurs and as briefly described above, initiation of injection of fuel to the associated engine occurs. When the capacitor 14 is discharged, the thyristor 17 will switch off, it being appreciated that the circuit 16 is a high impedance circuit and is incapable of supplying sufficient current to maintain the thyristor in a conducting state. The stack of crystals 10 will remain in the charged and therefore expanded states, since diode 20 will be reverse biassed.

When it is required to discharge the stack of crystals to achieve construction of the crystals, the thyristor 19 is fired, and the stack of crystals discharges into the secondary winding of the transformer. During this discharge a voltage is induced in the primary winding of the transformer and this is passed by way of the diode 18 to the capacitor 14 so that the latter is at least partly recharged. Any loss of energy which may occur during the sequence described above, is replaced by the battery 15. Diode 21 acts to prevent the stack of crystals being charged in the reverse direction.

In some instances, it may be required to provide for incremental charging of the stack of crystals, and this may be achieved by using a further capacitor chargeable to a higher voltage and which can be discharged into the primary winding of the transformer through a further thyristor.

Figure 2:
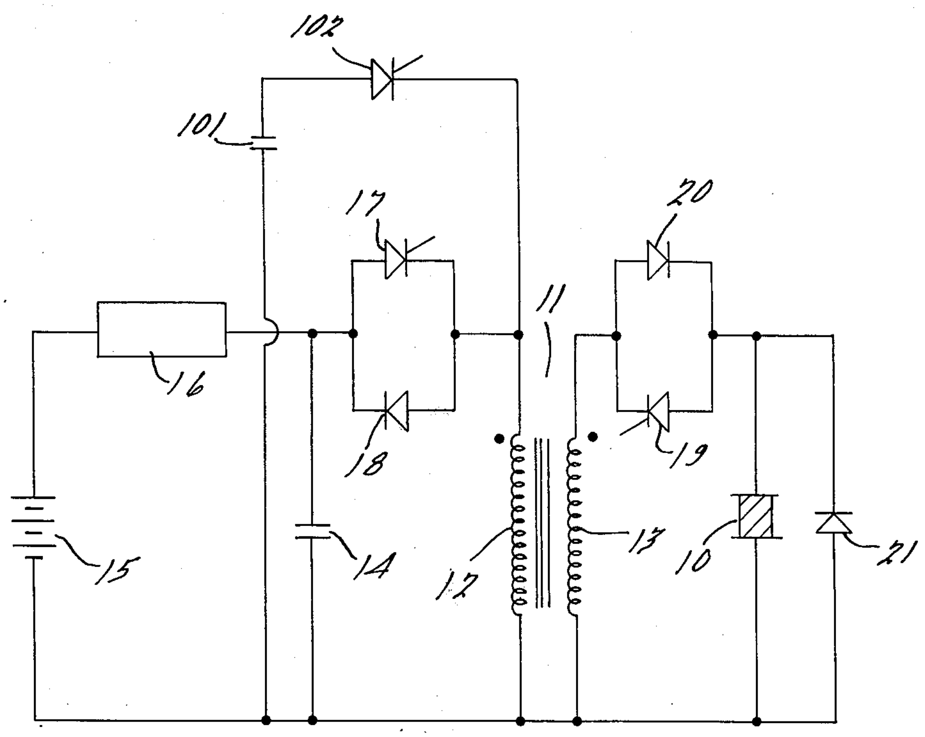
FIG. 2 shows an alternate embodiment used where incremental charging of the crystal stack is required.

This arrangement is shown in FIG. 2, wherein the parts of the basic circuit have the same reference numerals as FIG. 1. The additional capacitor, indicated at 101, is connected to accumulator 15 so that it can be discharged into primary winding 12 of the transformer through an additional thyristor 102.

We claim:

1. A control circuit for controlling the electrical charging and discharging of a stack of piezo-electric crystals and comprising a capacitor, means for connecting said capacitor to a source of supply, a transformer having primary and secondary windings, a first thyristor connected between said capacitor and primary winding and which when fired allows the capacitor to discharge through said primary winding, a diode, a stack of crystals, said secondary winding being connected through said diode to said stack of crystals so that the stack of crystals is charged when said first thyristor is fired, and a second thyristor connected to said stack of crystals, and means for firing said second thyristor to effect discharge of said stack.

2. A circuit as claimed in claim 1 in which said second thyristor is connected in parallel with said diode between said second winding and said stack, and a further diode in parallel with said first thyristor between said first winding and said capacitor, whereby firing of said second thyristor will cause the stack of crystals to be discharged through the transformer and effect charging of said capacitor.

3. A circuit as claimed in claim 1 including a further diode connected in parallel with the stack of piezo-electric crystals, said further diode acting to prevent reverse charging of the crystals.

4. A circuit as claimed in claim 1, further provided with a high impedance supply circuit for charging said capacitor.

5. A circuit as claimed in claim 1, further provided with an additional capacitor, means for connecting said additional capacitor to said source of supply, and an additional thyristor connected between said additional capacitor and said primary transformer winding and which when fired allows said additional capacitor to discharge through said primary winding.

* * * * *